(12) United States Patent
Hodgkins et al.

(10) Patent No.: US 11,883,806 B2
(45) Date of Patent: Jan. 30, 2024

(54) ACTIVE COMPONENT CARRIER COMPOSITION, AND METHOD FOR MANUFACTURE OF CATALYST MATERIALS

(71) Applicant: Saudi Arabian Oil Company, Dhahran (SA)

(72) Inventors: Robert P. Hodgkins, Dhahran (SA); Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/720,434

(22) Filed: Apr. 14, 2022

(65) Prior Publication Data

US 2023/0330651 A1    Oct. 19, 2023

(51) Int. Cl.
| | |
|---|---|
| *B01J 31/02* | (2006.01) |
| *B01J 21/08* | (2006.01) |
| *B01J 23/30* | (2006.01) |
| *B01J 29/83* | (2006.01) |
| *B01J 37/03* | (2006.01) |
| *B01J 37/04* | (2006.01) |
| *B01J 37/08* | (2006.01) |

(52) U.S. Cl.
CPC .......... *B01J 31/0222* (2013.01); *B01J 21/08* (2013.01); *B01J 23/30* (2013.01); *B01J 29/83* (2013.01); *B01J 31/0229* (2013.01); *B01J 37/031* (2013.01); *B01J 37/04* (2013.01); *B01J 37/08* (2013.01)

(58) Field of Classification Search
CPC .... B01J 31/0222; B01J 31/0229; B01J 21/08; B01J 23/30; B01J 29/83; B01J 37/031; B01J 37/04; B01J 37/08
See application file for complete search history.

(56) References Cited

U.S. PATENT DOCUMENTS

| | | | |
|---|---|---|---|
| 2,800,427 A | 7/1957 | Junk, Jr. et al. | |
| 10,781,168 B2 * | 9/2020 | Koseoglu | C07C 327/60 |
| 10,793,782 B2 | 10/2020 | Koseoglu et al. | |
| 10,807,947 B2 * | 10/2020 | Koseoglu | C07C 315/02 |
| 10,927,318 B2 | 2/2021 | Koseoglu et al. | |
| 10,995,278 B2 | 5/2021 | Koseoglu et al. | |

(Continued)

FOREIGN PATENT DOCUMENTS

CN    106046057 A    10/2016

OTHER PUBLICATIONS

Jo et al. Angew. Chem. Int. Ed. 2015, 54, 12805-12808 Supplementary Information (Year: 2015).*

(Continued)

*Primary Examiner* — Anthony J Zimmer
*Assistant Examiner* — Jordan W Taylor
(74) *Attorney, Agent, or Firm* — Leason Ellis LLP

(57) ABSTRACT

An active component carrier composition is disclosed comprising a mixture of one or more catalytically active components and one or more oxidized disulfide oil (ODSO) compounds, including a water-soluble fraction of ODSO. In certain embodiments the ODSO is obtained from the effluent of an enhanced MEROX process. The active component carrier composition facilitates transfer of catalytically active components (or components that will be catalytically active in the finished solid catalyst material) onto the surface of support materials.

19 Claims, 6 Drawing Sheets

(56) References Cited

U.S. PATENT DOCUMENTS

| | | |
|---|---|---|
| 11,111,212 B2 | 9/2021 | Koseoglu et al. |
| 11,124,713 B2 | 9/2021 | Koseoglu et al. |
| 11,649,169 B2 * | 5/2023 | Koseoglu .................. C01F 7/14 |
| | | 423/335 |
| 11,685,663 B2 * | 6/2023 | Hodgkins ............. C01B 33/128 |
| | | 423/338 |
| 2018/0100107 A1 * | 4/2018 | Alhooshani .......... B01J 29/0341 |
| 2022/0411274 A1 | 12/2022 | Hodgkins et al. |
| 2023/0108772 A1 * | 4/2023 | Hodgkins ............... C01B 39/40 |
| | | 423/704 |

OTHER PUBLICATIONS

Jo et al. Angew. Chem. Int. Ed. 2015, 54, 12805-12808 (Year: 2015).*

International Search Report and Written Opinion for corresponding International Patent Application No. PCT/US23/18462 dated Jun. 13, 2023. 8 pages.

Daeyaert et al. "Machine-learning approach to the design of OSDAs for zeolite beta." Proceedings of the National Academy of Sciences 116.9 (2019): 3413-3418.

* cited by examiner

ACTIVE COMPONENT CARRIER COMPOSITION, AND METHOD FOR MANUFACTURE OF CATALYST MATERIALS

FIELD OF THE DISCLOSURE

The present disclosure relates in general to an active component carrier composition and synthesis methods using said active component carrier composition.

BACKGROUND OF THE DISCLOSURE

Solid catalysts are used in a multitude of applications within chemical and petrochemical processes. Catalyst selection and lifetime are often controlling factors in determining appropriate reactors and operating conditions. Important variables in the catalyst itself include the activity level, the selectivity to the desired reaction effluents, and structural stability.

Certain catalytic applications require specific active components. These active components can be added to solid support materials, for example as in elemental form, or as oxides, carbides or sulfides. Hydrotreating catalysts include one or more active components of metals or metal compounds selected from the Periodic Table of the Elements IUPAC Groups 6-10 (for example Co, Ni, Mo, and combinations thereof) on a support. Hydrocracking catalysts include one or more active components of metals or metal compounds selected from the Periodic Table of the Elements IUPAC Groups 6-10 (for example Co, Ni, W, Mo, and combinations thereof) on a support. Catalytic reforming catalysts generally contain one or more active components of metals or metal compounds selected from the Periodic Table of the Elements IUPAC Groups 8-10 (for example Pt or Pd). Hydrogenation catalysts generally contain one or more active components of metals or metal compounds selected from the Periodic Table of the Elements IUPAC Groups 7-10 (for example Pt or Pd). Oxidation catalysts generally contain one or more active components of metals or metal compounds selected from the Periodic Table of the Elements IUPAC Groups 4-10 (for example Mn, Co, Fe, Cr and Mo).

Across the many different types and purposes of catalysts, support materials can vary, and are often formed of two or more materials. Known support materials are amorphous or crystalline alumina, silica, silica alumina, titania, or zeolites. The active component(s) is/are incorporated on the surface of the particles, and/or within pores of the particles. These are also known as impregnated catalysts, where the preformed supports are treated after they are formed by various means to add the active metal component.

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in U.S. Pat. No. 10,807,947 the by-product DSO compounds from the mercaptan oxidation process can be oxidized, in the presence of a catalyst. The oxidation reaction products constitute an abundant source of ODSO compounds, sulfoxides, sulfonates, sulfinates and sulfones.

The ODSO stream co-produced contains ODSO compounds as disclosed in U.S. Pat. Nos. 10,781,168 and 11,111,212 as compositions (such as a solvent), in U.S. Pat. No. 10,793,782 as an aromatics extraction solvent, and in U.S Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

In regard to the above background information, the present disclosure is directed to provide a technical solution for effective compositions for carrying active components during manufacture of catalyst materials.

SUMMARY OF THE DISCLOSURE

In certain embodiments, an active component carrier composition is provided. The active component carrier composition comprises a mixture of one or more catalytically active components and one or more oxidized disulfide oil (ODSO) compounds.

In certain embodiments, the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl. In certain embodiments, the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl. In certain embodiments, the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl. In certain embodiments, the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl.

In certain embodiments, a mixture of ODSO compounds corresponds to oxidized disulfide oils present in an effluent refinery hydrocarbon stream recovered following catalytic oxidation of mercaptans present in the effluent refinery hydrocarbon stream. In certain embodiments, the one or more ODSO compounds are contained in reaction products, or a fraction of reaction products, derived from oxidation of disulfide oil compounds in the presence of an oxidation catalyst, wherein all or a portion of the oxidation catalyst is contained in the reaction products or the fraction of reaction products and is all or a portion of the one or more catalytically active components in the active component carrier composition; in certain embodiments the oxidation catalyst are metals or metal compounds containing one or more transition metals.

In certain embodiments, the one or more catalytically active components are metals or metal compounds selected from the Periodic Table of the Elements IUPAC Groups 4-12. In certain embodiments, the active component carrier composition comprises 0.01-5 percent by mass of the one or more catalytically active components. In certain embodiments, the active component carrier composition is in an aqueous solution. In certain embodiments, the active component carrier composition, further comprises one or more additional acidic components, for example, which are selected from the group consisting of hydrochloric acid, sulfuric acid, nitric acid, aqua regia, citric acid, acetic acid and combinations comprising one or more of the foregoing acidic components.

In certain embodiments, a method for synthesis of a material is provided using an active component carrier composition comprises a mixture of one or more catalytically active components and one or more ODSO compounds. The method comprises: forming a homogeneous aqueous mixture of precursors, reagents and an effective amount of the active component carrier composition; heating the homogeneous aqueous mixture under conditions and for a time effective to form solids as precipitate suspended in a supernatant as an intermediate suspension, wherein the precipitate comprise the synthesized material which contains one or more catalytically active components transferred from the active component carrier composition. In certain embodiments the homogeneous aqueous mixture is acidic. In certain embodiments a pH of the homogeneous aqueous mixture is approaching neutral or slightly alkaline. In certain embodiments the material comprises mesoporous silica which contains one or more catalytically active components transferred from the active component carrier composition, and the precursors and reagents comprise at least a silica source, an optional organosilane and a surfactant as a soft template material to influence a silica mesoporous structure, wherein the active component carrier composition comprises an acid medium for synthesis of mesoporous silica. In certain embodiments the material comprises a crystalline microporous aluminophosphate which contains one or more catalytically active components transferred from the active component carrier composition, and the precursors and reagents comprise an alumina source, an optional silica source, a phosphorus source, an acid medium, and a structure directing agent. In certain embodiments of the aforementioned methods, the active component carrier composition comprises one or more ODSO compounds that are contained in reaction products, or a fraction of reaction products, derived from controlled catalytic oxidation of disulfide oil compounds in the presence of an oxidation catalyst containing one or more transition metals. In certain embodiments tungsten is included in the active component carrier composition as at least one of said one or more transition metals.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

Figures 1, 2:
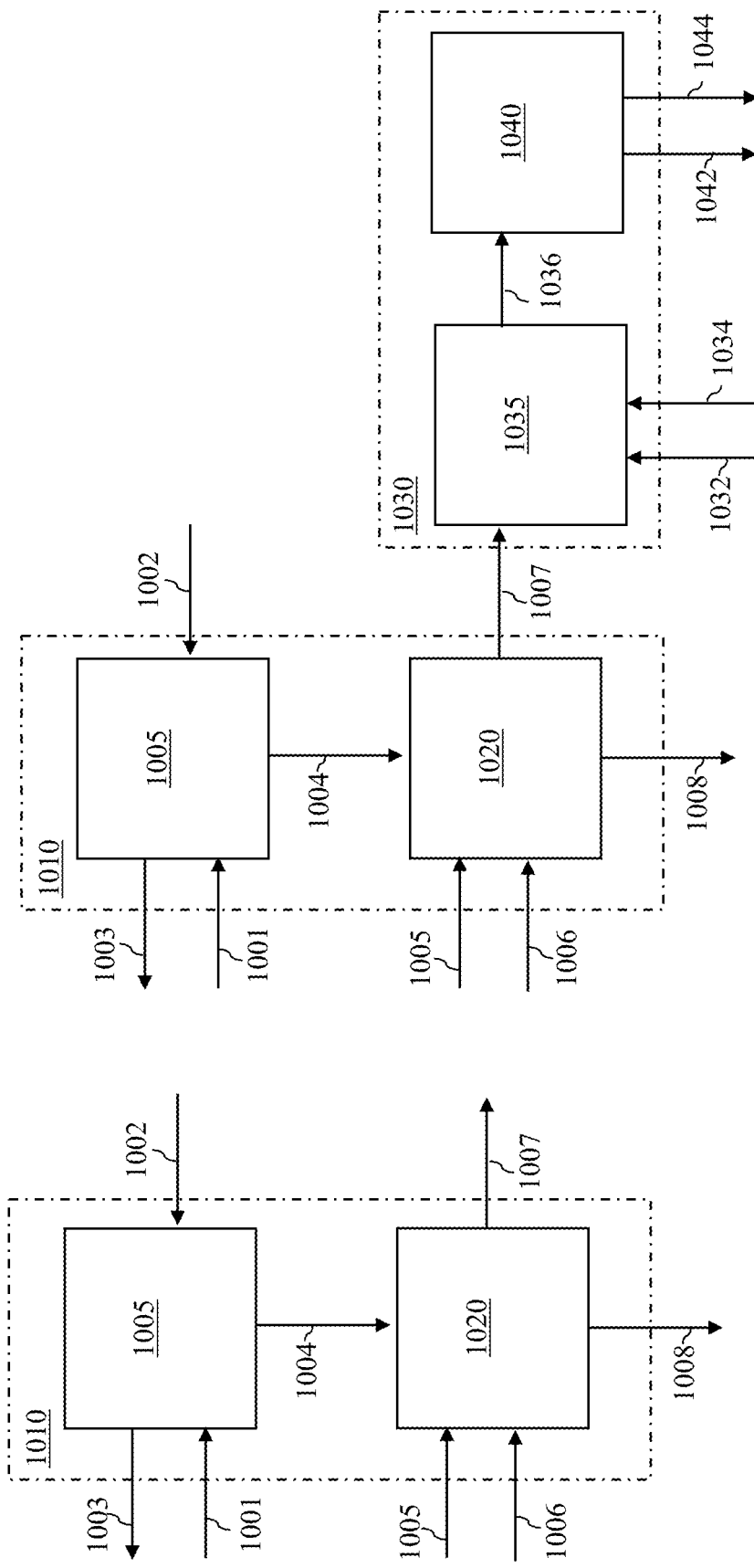
FIG. 1 is a simplified schematic diagram of a generalized version of a conventional mercaptan oxidation or MEROX process for the liquid-liquid extraction of a mercaptan containing hydrocarbon stream.
FIG. 2 is a simplified schematic diagram of a generalized version of an enhanced mercaptan oxidation or E-MEROX process.

An active component carrier composition is disclosed comprising a mixture of one or more catalytically active components and one or more oxidized disulfide oil (ODSO) compounds, including a water-soluble fraction of ODSO. In certain embodiments the ODSO is obtained from the effluent of an enhanced MEROX process. The active component carrier composition facilitates transfer of catalytically active components (or components that will be catalytically active in the finished solid catalyst material) onto the surface of support materials.

In the processes disclosed herein, an effective amount of the active component carrier composition is used to facilitate incorporation of active components in catalyst materials. In certain embodiments the active component carrier composition is employed as a component during intra-synthesis active component incorporation.

The active component(s) are incorporated in an effective concentration in the active component carrier composition. In certain embodiments, the active component(s) are added to the ODSO or mixture including ODSO components based on their solubility. In certain embodiments, an effective concentration of active component(s) in the active component carrier composition is in the range of about 0.01-5, 0.05-5, 0.1-5, 0.01-3, 0.05-3, 0.1-3, 0.01-2, 0.05-2 or 0.1-2 percent by mass of the active component carrier composition.

In certain embodiments, an active component carrier composition is provided that is undiluted from controlled catalytic oxidation of DSO, and includes about 50-100, 75-100, 90-100 percent by mass of one or more ODSO compounds, or an ODSO mixture; and wherein carrying active component(s) in the range of about 0.01-5, 0.05-5, 0.1-5, 0.01-3, 0.05-3, 0.1-3, 0.01-2, 0.05-2 or 0.1-2 percent by mass (referred to herein for convenience as a "neat" ODSO active component carrier composition).

In certain embodiments, an active component carrier composition comprises a neat ODSO active component carrier composition that is diluted with water, for instance wherein the neat ODSO active component carrier composition (which contains the active component(s)) comprises 1-99.9, 5-99.9, 10-99.9, 25-99.9, 50-99.9, 0.1-90, 1-90, 5-90, 10-90, 25-90, 50-90, 0.1-75, 1-75, 5-75, 10-75, 25-75 or 50-75 percent by mass of the solution.

In certain embodiments, an active component carrier composition comprises a neat or diluted ODSO active component carrier composition, mixed with one or more additional acidic components, for example hydrochloric acid, sulfuric acid, nitric acid, aqua regia (a mixture of nitric acid and hydrochloric acid, optimally in a molar ratio of nitric:hydrochloric of 1:3), citric acid, acetic acid or combinations comprising one or more of the foregoing acids. The additional acid is in aqueous diluted form, for example from a solution of 0.1-99.9 percent by mass, which is combined with the neat or diluted ODSO active component carrier composition to form an active component carrier composition herein.

In certain embodiments, an active component carrier composition comprises a diluted ODSO active component carrier composition, mixed with one or more additional acidic components, for example hydrochloric acid, sulfuric acid, nitric acid, aqua regia, citric acid, acetic acid or combinations comprising one or more of the foregoing acids. The additional acid can be provided in pure (100 percent by mass acid) or in aqueous diluted form, for example from a solution of 0.1-99.9 percent by mass; the pure or diluted acid is combined with the diluted ODSO active component carrier composition to form an active component carrier composition herein.

One or more catalytically active components are included in a mixture with one or more ODSO compounds for use as active component carriers. The one or more active components can vary, depending upon the application of the catalyst being manufactured. The active component can be a metal or a non-metal, in elemental form or as a compound such as oxides, carbides or sulfides. For instance, one or more active components one or more active components for hydrotreating catalysts can include one or more metals or metal compounds selected from the Periodic Table of the Elements IUPAC Groups 4-12. In certain embodiments one or more active components are selected for producing hydrotreating catalysts and can include one or more metals or metal compounds selected from the Periodic Table of the Elements IUPAC Groups 6-10 (for example Co, Ni, Mo, and combinations thereof). In certain embodiments one or more active components are selected for producing hydrocracking catalysts and can include one or more metals or metal compounds selected from the Periodic Table of the Elements IUPAC Groups 6-10 (for example Co, Ni, W, Mo, and combinations thereof). In certain embodiments one or more active components are selected for producing catalytic reforming catalysts and can include one or more metals or metal compounds selected from the Periodic Table of the Elements IUPAC Groups 8-10 (for example Pt or Pd). In certain embodiments one or more active components are selected for producing hydrogenation catalysts and can include one or more metals or metal compounds selected from the Periodic Table of the Elements IUPAC Groups 7-10 (for example Pt or Pd), and/or one or more non-metal compound such as P. In certain embodiments one or more active components are selected for producing oxidation catalysts and can include one or more metals or metal compounds selected from the Periodic Table of the Elements IUPAC Groups 4-10 (for example Ti, V, Mn, Co, Fe, Cr and Mo) or from the Periodic Table of the Elements IUPAC Groups 4-12 (for example Ti, V, Mn, Co, Fe, Cr, Cu, Zn, W, Mo).

In certain embodiments, the active component(s) in the active component carrier composition are carried over from the preceding catalytic oxidation of MEROX process by-products DSO, and accordingly the concentration depends on the amount used therein. In certain embodiments, catalytic oxidation of MEROX process by-products DSO can occur with an increased amount of oxidation catalyst compared to that which is typically used, wherein excess is passed with the ODSO fraction and used herein as the active component carrier composition (with or without additional active component(s)).

In certain embodiments, the active component carrier composition containing the one or more ODSO compounds and the one or more catalytically active components is derived from a sulfur-containing refinery waste stream of disulfide oil. The active component carrier composition is derived from reaction products, or a fraction of reaction products, obtained from oxidation of disulfide oil compounds in the presence of an oxidation catalyst. All or a portion of the oxidation catalyst is contained in the reaction products or the fraction of reaction products. That retained oxidation catalyst is then reused in a beneficial manner as all or a portion of the one or more catalytically active components in the active component carrier composition, that is transferred to the formed catalyst material. For example, as described above and in commonly owned U.S. Pat. No. 10,807,947 which is incorporated by reference herein in its entirety, a controlled catalytic oxidation of MEROX process by-products DSO can be carried out. The resulting oxidized effluents contain ODSO. As disclosed in U.S. Pat. No. 10,807,947, the by-product DSO compounds from the mercaptan oxidation process can be oxidized, typically in the presence of a catalyst. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. In embodiments herein, a catalyst is used in the oxidation process. The oxidation catalyst can contain one active metals from IUPAC Groups 4-10 or from Groups 4-12 of the Periodic Table. In certain embodiments oxidation catalyst are metals or metal compounds containing one or more transition metals. In certain embodiments oxidation catalyst are metals or metal compounds containing one or more metals selected from the group consisting of Ti, V, Mn, Co, Fe, Cr, Cu, Zn, W, Mo and combinations thereof. In certain embodiments oxidation catalyst are compounds containing one or more metals or metal compounds selected from the group consisting of Mo (VI), W (VI), V (V), Ti (IV), and combinations thereof. In certain embodiments, suitable homogeneous catalysts include molybdenum acetylacetonate, bis(acetylacetonate) dioxomolybdenum, molybdenum naphthenate, molybdenum hexacarbonyl, tungsten hexacarbonyl, sodium tungstate and vanadium pentoxide. In certain embodiments, a suitable catalyst is sodium tungstate, $Na_2WO_4 \cdot 2H_2O$.

In certain embodiments one or more active components are added during synthesis of a solid catalytic material, referred to as intra-synthesis active component incorporation. In certain embodiments intra-synthesis active component incorporation uses the active component carrier composition as a component during material synthesis to effectuate transfer of some of the active component to the synthesized material, wherein the synthesis processes encompass those in which precursors and reagents are formed into a homogeneous mixture, typically an aqueous mixture, and heated to form a precipitate, which is recovered and typically dried to produce the synthesized material. In certain embodiments intra-synthesis active component incorporation is carried out using the active component carrier composition in a sol-gel process.

In certain embodiments intra-synthesis active component incorporation is carried out using a solution of precursors and reagents including the active component carrier composition that is acidic or slightly acidic. In certain embodiments intra-synthesis active component incorporation is carried out using a solution of precursors and reagents including the active component carrier composition that is approximately pH neutral or approaching pH neutral. In certain embodiments intra-synthesis active component incorporation is carried out using a solution of precursors and reagents including the active component carrier composition that is approaching pH neutral and/or is slightly alkaline, for example having a pH up to about 7.5-7.8.

In certain embodiments intra-synthesis active component incorporation is carried out using a solution of precursors and reagents in effective ratios, under effective conditions and for an effective time, to synthesize amorphous silica-alumina, wherein the solution further comprises an effective amount of the active component carrier composition.

In certain embodiments intra-synthesis active component incorporation is carried out using a solution of precursors and reagents in effective ratios, under effective conditions and for an effective time, to synthesize amorphous silica, wherein the solution further comprises an effective amount of the active component carrier composition.

In certain embodiments intra-synthesis active component incorporation is carried out using a solution of precursors and reagents in effective ratios, under effective conditions and for an effective time, to synthesize amorphous alumina, wherein the solution further comprises an effective amount of the active component carrier composition.

In certain embodiments intra-synthesis active component incorporation is carried out using a solution of precursors and reagents in effective ratios, under effective conditions and for an effective time, to synthesize mesoporous silica, wherein the solution further comprises an effective amount of the active component carrier composition.

In certain embodiments intra-synthesis active component incorporation is carried out using a solution of precursors and reagents in effective ratios, under effective conditions and for an effective time, to synthesize zeolites, wherein the solution further comprises an effective amount of the active component carrier composition.

In certain embodiments intra-synthesis active component incorporation is carried out using a solution of precursors and reagents in effective ratios, under effective conditions and for an effective time, to synthesize silicon-substituted aluminophosphates, wherein the solution further comprises an effective amount of the active component carrier composition.

In certain embodiments intra-synthesis active component incorporation is carried out using a solution of precursors and reagents in effective ratios, under effective conditions and for an effective time, to synthesize crystalline microporous aluminophosphates, wherein the solution further comprises an effective amount of the active component carrier composition.

In certain embodiments intra-synthesis active component incorporation is carried out using a solution of precursors and reagents in effective ratios, under effective conditions and for an effective time, to synthesize metal aluminophosphates, wherein the metal can include one or more of Ti, V, Cr, Mn, Fe, Co, Ni, Cu, Zn, Cd or Mg, wherein the solution further comprises an effective amount of the active component carrier composition.

Amorphous silica-alumina, silica and/or alumina are types of materials that can be produced herein. Mesoporous silica materials including large pore mesoporous silicas are types of material that can be produced herein, which include but are not limited to sub-types SBA (including SBA-15), MCM (including MCM-41), FDU or AMS. Silicon-substituted aluminophosphates, silicoaluminophosphate (SAPOs), are a type of material that can be produced herein, which include but are not limited to SAPO sub-types: (AEI) including SAPO-18, (AEL) including SAPO-11, (AFI) including SAPO-5, (AFO) including SAPO-41, (AFR) including SAPO-40, (AFX) including SAPO-56, (ATN) including SAPO-39, (ATO) including SAPO-31, (CHA) including SAPO-34 and -47, (FAU) including SAPO-37, (GIS) including SAPO-43, (LEV) including SAPO-35, or (LTA) including SAPO-42. Crystalline microporous aluminophosphates (AlPOs) are a type of material that can be produced herein, which include but are not limited to AlPO sub-types: (AEI) including AlPO-18, (AEL) including AlPO-11, (AEN) including AlPO-53, (AET) including AlPO-8, (AFI) including AlPO-5, (AFN) including AlPO-14, (AFO) including AlPO-41, (AFR) including AlPO-40; (AFT) including AlPO-52; (ANA) including AlPO-24; (AST) including AlPO-16; (ATO) including AlPO-31; (ATS) including AlPO-36; (ATT) including AlPO-33; (ATV) including AlPO-25; (AWO) including AlPO-21; (AWW) including AlPO-22; (CHA) including AlPO-34; (ERI) including AlPO-17; (LEV) including AlPO-35; (SOD) including AlPO-20; or (VFI) including AlPO-54.

Metal aluminophosphates (MAPOs) are a type of material that can be produced herein, which include but are not limited to MAPO sub-types: (AFI) including MAPO-5; (AFS) including MAPO-46; (ATN) including MAPO-39; (ATO) including MAPO-31; (ATS) including MAPO-36; or (GIS) including MAPO-43. Note that the three-letter codes designated herein correspond to the framework types established by the International Zeolite Association.

In certain embodiments of the processes herein, an effective amount of an active component carrier composition is used with a water solvent in an intra-synthesis active component incorporation method, wherein the active component carrier composition comprises a mixture of one or more catalytically active components and one or more ODSO compounds. For example, the active component carrier composition is added within a homogeneous mixture of precursors and reagents, also referred to as a sol-gel colloid, to replace an equivalent amount of water and/or acid in the solution on a mass or volume basis.

In certain embodiments, selection and ratios of precursors and reagents effective for synthesis of amorphous silica-alumina are known, including an alumina source and a silica source, which are formed as a homogeneous aqueous solution.

In certain embodiments, selection and ratios of precursors and reagents effective for synthesis of amorphous alumina are known, including an alumina source and optionally pore-forming agent, which are formed as a homogeneous aqueous solution.

In certain embodiments, selection and ratios of precursors and reagents effective for synthesis of amorphous silica are known, including a silica source, which are formed as a homogeneous aqueous solution.

In certain embodiments, selection and ratios of precursors and reagents effective for synthesis of mesoporous silica materials having long range order are known, including a silica source, an acid medium, and a surfactant as a soft template material to influence a silica mesoporous structure, which are formed as a homogeneous aqueous solution.

In certain embodiments, selection and ratios of precursors and reagents effective for synthesis of zeolite materials are known, including a silica source, an optional alumina source, a mineralizer, and optionally one or both of a structure directing agent and/or a seed material, which are formed as a homogeneous aqueous solution.

In certain embodiments, selection and ratios of precursors and reagents effective for synthesis of SAPO materials are known, including an alumina source, a silica source, a phosphorus source, an acid medium, and optionally one or both of a structure directing agent and/or a seed material, which are formed as a homogeneous aqueous solution. It is understood that the phosphorus source and the acid medium can be the same, for instance, phosphoric acid.

In certain embodiments, selection and ratios of precursors and reagents effective for synthesis of ALPO materials are known, including an alumina source, a phosphorus source, an acid medium, and optionally one or both of a structure directing agent and/or a seed material, which are formed as a homogeneous aqueous solution. It is understood that the phosphorus source and the acid medium can be the same, for instance, phosphoric acid.

In certain embodiments, selection and ratios of precursors and reagents effective for synthesis of MAPO materials, including an alumina source, a metal source, a phosphorus source, an acid medium, and optionally one or both of a structure directing agent and/or a seed material, which are formed as a homogeneous aqueous solution. It is understood that the phosphorus source and the acid medium can be the same, for instance, phosphoric acid. The metal source can be one or more of Ti, V, Cr, Mn, Fe, Co, Ni, Cu, Zn, Cd or Mg.

In the embodiments herein, the sub-type within a given material type can be controlled by one or more factors including but not limited to the precursor and reagent selections and ratios (for example, silica to alumina ratio), pH of the sol-gel, aging time (if any), crystallization temperature and crystallization time. In certain embodiments herein, the addition of the active component carrier composition in the synthesis process results in a different sub-type or even type of material as compared to an equivalent process in the absence of the added active component carrier composition. In certain embodiments herein, the compositional ratios of the precursors and reagents can be similar to those used in synthesis of similar products in the absence of the active component carrier composition herein. In some embodiments, for instance as demonstrated in Example 2 herein, the addition of the active component carrier composition herein shifts the phase boundary outside of the typical product for the selection and ratio of precursors and reagents. For example, where the only difference in compositional selection and ratio pertains to substitution of added water with the active component carrier composition herein, the material type shifts from SAPO to AlPO. It is also to be appreciated that the material sub-type can also shift from one to another when the active component carrier composition herein is used as a component in the material synthesis.

In embodiments of the processes herein, effective amounts of the selected precursors and reagents are provided, and a quantity of the active component carrier composition is added. The components are mixed for an effective time and under conditions suitable to form the homogeneous aqueous mixture. The chronological sequence of mixing can vary, with the objective being a highly homogenous distribution of the components in an aqueous mixture. The homogeneous aqueous mixture is heated under conditions and for a time effective to form a precipitate suspended in a supernatant. The precipitate is recovered, for example by filtration, washing and drying, as the product. In certain embodiments, the recovered precipitate is calcined at a suitable temperature, temperature ramp rate and for a suitable period of time at to realize porous product.

An effective amount of water for the aqueous environment compound can be provided by using one or more of added water, a water-containing silica source such as colloidal silica, a water-containing aluminum oxide source, or a water-containing structure directing agent in systems where they are used (wherein "added water" refers to utility water added to the system). These components are added with water to the reaction vessel prior to heating. Typically, water allows for adequate mixing to realize a more homogeneous distribution of the sol-gel components, which ultimately produces a more desirable and uniform product. For example, in crystalline structures, each crystal is more closely matched in properties to the next crystal. Insufficient mixing could result in undesirable "pockets" of highly concentrated sol-gel components and this may lead to impurities in the form of different structural phases or morphologies. Water also determines the yield per volume. In certain embodiments herein, all or a portion of the added water is replaced and wherein water is from one or more of a water-containing silica source, a water-containing aluminum oxide source, or a water-containing structure directing agent.

Certain synthesis processes for types and sub-types of materials use an aluminum source, and that aluminum source can comprise, without limitation, one or more of aluminates, alumina, other zeolites, aluminum colloids, boehmites, pseudo-boehmites, aluminum salts such as aluminum nitrate, aluminum sulfate and alumina chloride, aluminum hydroxides and alkoxides, aluminum wire and alumina gels. For example, suitable materials as aluminum sources include commercially available materials including for instance high purity aluminas (CERALOX commercially available from Sasol) and alumina hydrates (PURAL and CAPITAL commercially available from Sasol), boehmites (DISPERSAL and DISPAL commercially available from Sasol), and silica-alumina hydrates (SIRAL commercially available from Sasol) and the corresponding oxides (SIRALOX commercially available from Sasol).

Certain synthesis processes for types and sub-types of materials use a silica source, and that silica source can comprise, without limitation, one or more of silicates including sodium silicate (water glass), fumed silica, precipitated silica, colloidal silica, silica gels, zeolites, dealuminated zeolites, silicon hydroxides and silicon alkoxides. In certain embodiments silica sources resulting in a high relative yield are preferred. For instance, suitable materials as silica sources include fumed silica (commercially available from Cabot) and colloidal silica (LUDOX commercially available from Cabot).

Certain synthesis processes for types and sub-types of materials use a phosphorus source, and that phosphorus source can comprise, without limitation, one or more of phosphoric acid, phosphoric acid salt, pyrophosphoric acid or phosphorous acid.

Certain synthesis processes for types and sub-types of materials use a metal source, and that metal source can comprise, without limitation, one or more of Ti, V, Cr, Mn, Fe, Co, Ni, Cu, Zn, Cd or Mg.

Certain synthesis processes for types and sub-types of materials use a structure directing agent; such structure directing agents are typically selected based on the type and sub-type of material being produced.

Structure directing agents that can optionally be added for zeolite synthesis include known or developed structure directing agents for various zeolite sub-types. In certain embodiments, effective structure directing agents include one or more of quaternary ammonium ions, trialkylamines, dialkylamines, monoalkylamines, cyclic amines, alkylethanol amines, cyclic diamines, alkyl diamines, alkyl polyamines, and other templates including alcohols, ketones, morpholine and glycerol. In certain embodiments, effective structure directing agents include any of the thousands of structure directing agents for producing zeolite beta can be used, as disclosed in Daeyaert, Frits, Fengdan Ye and Michael W. Deem. "Machine-learning approach to the design of OSDAs for zeolite beta." Proceedings of the National Academy of Sciences of the United States of America 116 (2019): 3413-18, which is incorporated by reference herein. In certain embodiments, one or more of quaternary ammonium cation compounds can be selected as a structure directing agent, including one or more of tetramethylammonium (TMA) cation compounds, tetraethylammonium (TEA) cation compounds, tetrapropylammonium (TPA) cation compounds, tetrabutylammonium (TBA) cation compounds, cetyltrimethylammonium (CTA) cation compounds; the cation can be paired with one or more of a hydroxide anion (for example, TPAOH or CTAOH), a bromide anion (for example, TPAB or CTAB), or an iodide anion. In certain embodiments, other known structure directing agents can be selected, including but are not limited to one or more of: 4,4'trimethylene bis(N-methyl N-benzyl-piperidinium) hydroxide; 1,2-diazabicyclo 2,2,2 octane (DABCO); dialkylbenzyl ammonium hydroxide; dimethyldiisopropylammonium hydroxide (DMDPOH); N,N-dimethyl-2,6-cis-dimethylpiperdinium hydroxide (DMPOH); N-ethyl-N,N-dimethylcyclohexanaminium hydroxide (EDMCHOH); N,N,N-trimethylcyclohexanaminium hydroxide (TMCHOH); N-isopropyl-N-methyl-pyrrolidinium (iProOH); N-isobutyl-N-methyl-pyrrolidinium (iButOH); or N-isopentyl-N-methyl-pyrrolidinium (iPenOH); one or more of: mixed organic templates such as glycerol, ethylene glycol or polyethylene glycol; pyrrolidine-based mesoporogens; piperazine; 1,6-diaminohexane; diethylpiperidinium; or co-operative organic templates such as N,N,N-trimethyl-1,1-adamant ammonium and 1,2-hexanediol; bifunctional dicationic molecules containing a long aliphatic chain (for example $C_{22}H_{45}$—$N^+(CH_3)_2$—$C_6H_{12}$—$N^+(CH_3)_2$—$C_6H_{13}$, denoted $C_{22\text{-}6\text{-}6}$, $C_{22}H_{45}$—$N^+(CH_3)_2$—$C_6H_{12}$—$N^+(CH_3)_2$—$C_3H_7$, denoted $C_{22\text{-}6\text{-}3}$, or a poly(ethylene glycol)), dual-porogenic surfactants, silylated polyethylenimine polymers, amphiphilic organosilanes, or hydrophilic cationic polyelectroyltes/polymers such as poly(diallyldimethylammonium chloride) (PDADMAC); N,N,N-Trimethyladamantan-1-aminium hydroxide; or trimethyl (cyclohexylmethyl) ammonium cations.

Structure directing agents that can optionally be added for synthesis of SAPOs, AlPOs or MAPOs can be one or more known or developed structure directing agents, including but not limited to one or more of secondary and tertiary amine derived templates, quaternary ammonium derived templates, azamacrocycle derived templates, spiro templates, diaazabicyclo derived templates, or phosphazine based templates.

Structure directing agents that can optionally be added for synthesis of mesoporous silica can be one or more known or developed structure directing agents, including but not limited to one or more of cationic surfactants, anionic surfactants, non-ionic surfactants, zwitterionic surfactants or quaternary ammonium-based compounds.

The disclosed process for synthesizing the various material types and sub-types herein in the presence of an active component carrier composition herein, particularly crystalline materials, can occur in the absence or presence of seed materials. The selection of the seed materials corresponds to the desired crystalline material type and sub-type that is being synthesized, such as zeolites, SAPOs, AlPOs and MAPOs. Functions of the seeds can include, but are not limited to: supporting growth on the surface of the seed, that is, where crystallization does not undergo nucleation but rather crystal growth is directly on the surface of the seed; the parent gel and seed share common larger composite building units; the parent gel and seed share common smaller units, for instance 4 member rings; seeds that undergo partial dissolution to provide a surface for crystal growth of a zeolite; crystallization occurs through a "coreshell" mechanism with the seed acting as a core and the target material grows on the surface; and/or where the seeds partially dissolve providing essential building units that can orientate zeolite crystallization.

In embodiments in which a neutral or slightly alkaline environment is typically used for the material synthesis, processes for synthesizing materials having active component(s) supported thereon can occur in the presence of a hydroxide mineralizer as the alkali metal source selected from the Periodic Table IUPAC Group 1 alkali metals (and/or from the hydroxide of any hydroxide-containing structure directing agent). For example, these are selected from the group consisting of NaOH, KOH, RbOH, LiOH, CsOH and combinations thereof. In certain embodiments a Na-based hydroxide mineralizer is selected. Note that the alkali metal source is provide as a hydroxide, but in embodiments herein where the ratio is expressed based on the mass of the alkali, it is the metal itself. For instance, when the alkali is NaOH, the ODSO/Na ratio is determined by dividing the mass of the ODSO by the mass of the Na portion of NaOH, that is, about 57.5% of the NaOH mass. In addition, where the hydroxide mineralizer is employed to adjust the pH, it is appreciated that the overall pH is influenced by anions from a hydroxide mineralizer source, and in certain embodiments anions other sources such as from an optional structure directing agent, an alumina source or a silica source. In certain embodiments hydroxide anions are provided as the mineralizer from an alkali metal source and a structure directing agent. In the process herein, the pH is reduced by the presence of ODSO, therefore, the quantity of the basic compound from one or more of the aforementioned sources can be adjusted accordingly to attain the requisite pH.

In embodiments of the processes herein, mixing steps of the precursors and reagents typically occur at ambient temperature and pressure (for instance about 20° C. and about 1 standard atmosphere), for a mixing time that sufficient to realize a homogeneous aqueous distribution of the components. In certain embodiments the homogeneous aqueous mixture can be aged before being subjected to subsequent hydrothermal treatment, for example for a period of about 0-24, 0-5, 0.5-24 or 0.5-5 hours. Hydrothermal treatment is carried out at a temperature in the range of about 90-200, 120-200, 100-180, 120-180, 100-160, 120-160 or 130-150° C., at atmospheric or autogenous pressure (from the sol-gel or from the sol-gel plus an addition of a gas purge into the vessel prior to heating), and for a time period within the range of about 0.1-7, 0.2-7, 0,1-6, 0.2-6, 0.1-5 or 0.2-5 days, to ensure hydrolysis and formation of a gel.

The products are washed, for example with water at a suitable quantity, for example at about twice the volume of the homogeneous aqueous mixture. The wash can be at a temperature of from about 20-80° C. at atmospheric, vacuum or pressure. The wash can continue until the pH of the filtrate approaches 7-9. The solids are recovered by filtration, for instance, using known techniques such as centrifugation, gravity, vacuum filtration, filter press, or rotary drums, and dried, for example at a temperature of up to about 110 or 150° C.

The conditions for calcination to produce porous product herein can include temperatures in the range of about 450-700, 450-600, 500-700 or 500-600° C., atmospheric pressure, and a time period of about 3-24, 3-18, 6-24 or 6-18 hours. Calcining can occur with ramp rates in the range of from about 0.1-10, 0.1-5, 0.1-3, 1-10, 1-5 or 1-3° C. per minute. In certain embodiments calcination can have a first step ramping to a temperature of between about 100-150° C. with a holding time of from about 2-24 hours (at ramp rates of from about 0.1-5, 0.1-3, 1-5 or 1-3° C. per min) before increasing to a higher temperature with a final holding time in the range of about 2-24 hours.

In certain embodiments, an active component carrier composition is used in the synthesis of mesoporous silica. Selection and ratios of precursors and reagents effective for synthesis of mesoporous silica materials are known, including a silica source, an acid medium, and a surfactant as a soft template material to influence a silica mesoporous structure, which are formed as a homogeneous aqueous solution. The acidic medium used in conventional synthesis of mesoporous silica is typically hydrochloric acid (HCl), sulfuric acid ($H_2SO_4$), hydrobromic acid (HBr), phosphoric acid ($H_3PO_4$) or nitric acid ($HNO_3$). For example, commonly reported SBA-15 synthesis methods use HCl as the acid medium. In the embodiments of the present disclosure, an effective amount of an active component carrier composition is used, as a substitute for all or a portion of the acidic medium and as a carrier for the active component, wherein the active component carrier composition comprises a mixture of one or more catalytically active components and one or more ODSO compounds. The active component carrier composition is added as a component the sol-gel colloid, and a quantity of active component from the carrier composition is transferred to the synthesized material, for instance supported on the surface and/or within the pores of the synthesized material.

Aside from the addition of the active component carrier composition, the sol-gel synthesis can be similar to known processes. For example, a sol-gel route that is typically used to synthesize SBA-15 involves a two-step process: a hydrolysis step followed by a condensation step:

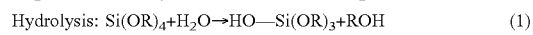

Hydrolysis: $Si(OR)_4 + H_2O \rightarrow HO-Si(OR)_3 + ROH$ \quad (1)

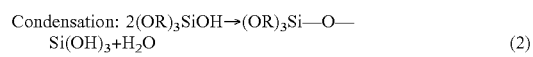

Condensation: $2(OR)_3SiOH \rightarrow (OR)_3Si-O-Si(OH)_3 + H_2O$ \quad (2)

where R is an alkyl.

In general, a sol-gel synthesis process to realize mesoporous silica having active component(s) supported thereon starts with a colloidal aqueous solution of a (i) silica source, (ii) an acid medium, and (iii) a surfactant as a soft template material to influence a silica mesoporous structure. In conventional SBA-15 synthesis processes, the acid medium is a separate acid. In the process herein, the acidity of the acid medium is modified by the ODSO compounds in the active component carrier composition, directly and/or based on hydrolysis in the water medium to form acids. In addition, in the process herein, the active component(s) are transferred from the active component carrier composition to the synthesized mesoporous silica.

In the process for synthesizing mesoporous silicas having active component(s) supported thereon, surfactants can be used as is known to influence the structure. Surfactants used as the templates for large pore mesoporous silicas are copolymers, block copolymers or triblock copolymers, and are generally amphiphilic molecules. The amphiphilic molecules can be cationic, anionic, non-ionic and/or zwitterionic. In certain embodiments an effective surfactant comprises a non-ionic surfactant. In certain embodiments an effective surfactant comprises a triblock copolymer of ethylene oxide/propylene oxide/ethylene oxide. For example, a suitable triblock copolymer of ethylene oxide/propylene oxide/ethylene oxide has the general composition $EO_{20}PO_{70}EO_{20}$, and is commercially available under the tradename Pluronic P123 (BASF), and is useful for the synthesis of SBA-15.

The mesoporous silica formation including the surfactant is acid-catalyzed, for example to realize a pH level less than about 3, 2 or 1. In conventional SBA-15 synthesis, this is by the addition of an effective amount of HCl, $H_2SO_4$, HBr, $H_3PO_4$ or $HNO_3$; typically in reported SBA-15 synthesis methods the acid is HCl. In the process herein to produce mesoporous silicas having active component(s) supported thereon, all or a portion of the requisite acidity is contributed by the ODSO from the active component carrier composition. For example, a conventional acid source as noted above can be used in an amount that is 0-99, 0-50, 0-25, 5-99, 5-50 or 5-25 molar % of the amount required to attain a pH in a range of about 1-3 in the absence of ODSO. In certain embodiments, the only acidity modifier is the ODSO from the from the active component carrier composition. In certain embodiments, one or more additional acidic components can be added, within the active component carrier composition or separately.

The silica source for mesoporous silica formation can comprise, for example, one or more of tetraethyl orthosilicate (TEOS), tetramethyl orthosilicate (TMOS), tetrapropyl orthosilicate (TPOS), tetrabutyl orthosilicate (TBOS) or sodium (meta)silicate.

In the process herein for mesoporous silica formation, the ratios of silica source the surfactant and water include those that are effective for producing SBA-15 mesoporous silica, including for example surfactant in the range of about 1-5, 1-3, 2-5, 2-3 or about 2.5 mass percent relative to the mass of the total sol-gel composition. ODSO from the active component carrier composition alone or in combination with another acid source serves as an acidity modifier and in certain embodiment is added at an effective quantity to attain a pH level of less than or equal to about 3, 2 or 1. In the synthesis steps for producing mesoporous silicas having active component(s) supported thereon, the sequence of adding the components is described above, but can be varied. In certain embodiments, the surfactant, water and the active component carrier composition, optionally in combination with another acid, are formed into a solution, to which the silica is then added. In other embodiments, the active component carrier composition can be added with the silica source.

Suitable conditions for the mixing steps described herein to produce the aqueous mixture of silica, surfactant and the active component carrier composition (and optionally another acidic component) are similar to those used in conventional SBA-15 synthesis, and can be, for instance, in the range of about 20-65 or 20-50° C., and at atmospheric pressure. The mixing time before silica addition is generally dependent on the time that it takes for the surfactant and the active component carrier composition to dissolve, and thereafter the silica is added and mixed until fully dissolved and in certain embodiments mixed for an additional 0-24 or 0-4 hours after it is fully dissolved. The hydrolysis reactions occur at temperature and pressure conditions similar to those used in conventional SBA-15 synthesis, for instance about 20-65 or 35-65° C. and at atmospheric or autogenous pressure, and for a time period of about 10 minutes to 24 hours or 4-24 hours. Also, condensation reactions occur at temperature and pressure conditions similar to those used in conventional SBA-15 synthesis, for instance about 80-120, 90-120, 80-110 or 90-110° C. and at atmospheric or autogenous pressure, and for a time period of about 1-4 or 1-2.5 days. The temperature and pressure conditions, and residence time, for the washing and filtration steps to recover precipitate from the supernatant that is used for producing SBA-15 mesoporous silicas and the novel mesoporous silicas herein are in the range of about: 20-80° C., at atmospheric pressure or vacuum pressure (for instance, up to about 33, 135 or 160 millibars absolute), and can occur until the pH of the filtrate approaches 7-9. The wash can be, for example, using wash water at twice the volume of the sol-gel. The wash can be until foam (residual surfactant) is significantly reduced. Filtration is accomplished, for instance, using known techniques such as centrifugation, gravity, vacuum filtration, filter press, or rotary drums. The temperature and time for calcination to produce mesoporous silicas having active component(s) supported thereon can be in the range of about: 215-600 or 450-600° C., for about 4-24, 4-16, 8-24 or 8-16 hours, and a ramp rate of about 1-10 or 1-5° C. per minute.

The active component carrier composition comprises one or more ODSO compounds. The active component carrier can be a mixture that comprises two or more ODSO compounds. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

In embodiments in which the active component carrier composition is used during intra-synthesis active component incorporation, the concentration of the active component carrier composition can be based on the mass of active component carrier composition relative to the total mass of the solution of precursors and reagents. For example, an effective amount of the active component carrier composition including one or more active components contained therein can be in the range of about 0.5-35, 0.5-30, 0.5-20, 0.5-15, 0.5-10, 1-35, 1-30, 1-20, 1-15, 1-10, 5-35, 5-5-20, 5-15, 5-10, 10-35, 10-30, 15-35 or 20-35 mass percent relative to the total mass of the solution.

In certain embodiments, the active component carrier composition is obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SOS—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl. It will be understood that since the source of the DSO is a refinery feedstream, the R substituents vary, e.g., methyl and ethyl subgroups, and the number of sulfur atoms, S, in the as-received feedstream to oxidation can extend to 3, for example, trisulfide compounds.

In certain embodiments the water-soluble compounds and water-insoluble compounds are separated from one another, and the active component carrier composition comprises all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments an active component carrier composition comprises, consists of or consists essentially of at least one water-soluble ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl. In certain embodiments an active component carrier composition comprises, consists of or consists essentially of a mixture or two or more water-soluble ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl. In certain embodiments an active component carrier composition comprises, consists of or consists essentially of ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' can be the same or different C1-C10 alkyl or C6-C10 aryl. In certain embodiments, the R and R' are methyl and/or ethyl groups. In certain embodiments, the ODSO compound(s) used as an active component carrier composition have 1 to 20 carbon atoms.

In certain embodiments, an active component carrier composition comprises, consists of or consists essentially of ODSO compounds having an average density greater than about 1.0 g/cc. In certain embodiments, an active component carrier composition comprises, consists of or consists essentially of ODSO compounds having an average boiling point greater than about 80° C. In certain embodiments, an active component carrier composition comprises, consists of or consists essentially of ODSO compounds having a dielectric constant that is less than or equal to 100 at 0° C.

Table 1 includes examples of polar water-soluble ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the ODSO compounds used as active component carriers comprise all or a portion of water-soluble ODSO compounds contained in an oxidation effluent stream that is derived from controlled catalytic oxidation of MEROX process by-products, DSO compounds, as disclosed in U.S. Pat. Nos. 10,807,947 and 10,781,168 and as incorporated herein by reference above.

In some embodiments, the ODSO compounds used as active component carriers are derived from oxidized DSO compounds present in an effluent refinery hydrocarbon stream recovered following the catalytic oxidation of mercaptans present in the hydrocarbon stream. In some embodiments, the DSO compounds are oxidized in the presence of a catalyst.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + \tfrac{1}{4} O_2 \rightarrow \tfrac{1}{2} RSSR + \tfrac{1}{2} H_2O \qquad (3)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R' in the reaction. The reaction is then written:

$$2\,R'SH + 2\,RSH + O_2 \rightarrow 2\,R'SSR + 2\,H_2O \qquad (4)$$

This reaction occurs spontaneously whenever any sour mercaptan-bearing distillate is exposed to atmospheric oxygen, but proceeds at a very slow rate. In addition, the catalyzed reaction (3) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Referring to the attached drawings, FIG. 1 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in counter-current flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding di-sulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds.

The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and combinations thereof. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing water-soluble ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-soluble ODSO present in the ODSO product. Details of the ODSO compositions are discussed in the USP which is incorporated herein by reference above.

FIG. 2 is a simplified schematic of an E-MEROX process that includes E-MEROX unit 1030. The MEROX unit 1010 unit operates similarly as in FIG. 1, with similar references numbers representing similar units/feeds. In FIG. 2, the effluent stream 1007 from the generalized MEROX unit of FIG. 1 is treated. It will be understood that the processing of the mercaptan containing hydrocarbon stream of FIG. 1 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-monosulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments water-soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to ppmw. The alcohol by-product fraction can contain a small amount of water-soluble ODSO compounds, for example, in the range of from 100 ppmw to 50,000 ppmw.

Examples

The below examples and data are exemplary. It is to be understood that other ratios and types of aluminum sources, silica sources, bases and structure directing agents can be used as compared to the examples.

Figure 3A:
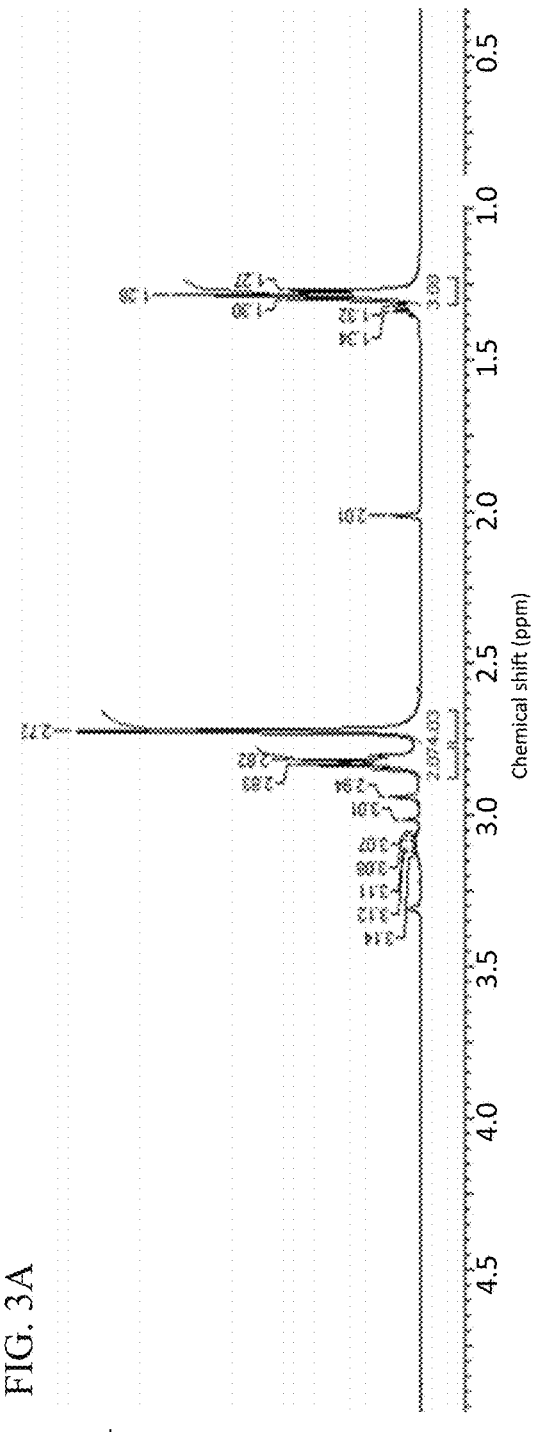
FIG. 3A is the experimental $^1$H-NMR spectrum of the polar, water-soluble ODSO fraction used as an active component carrier herein.
Figure 3B:
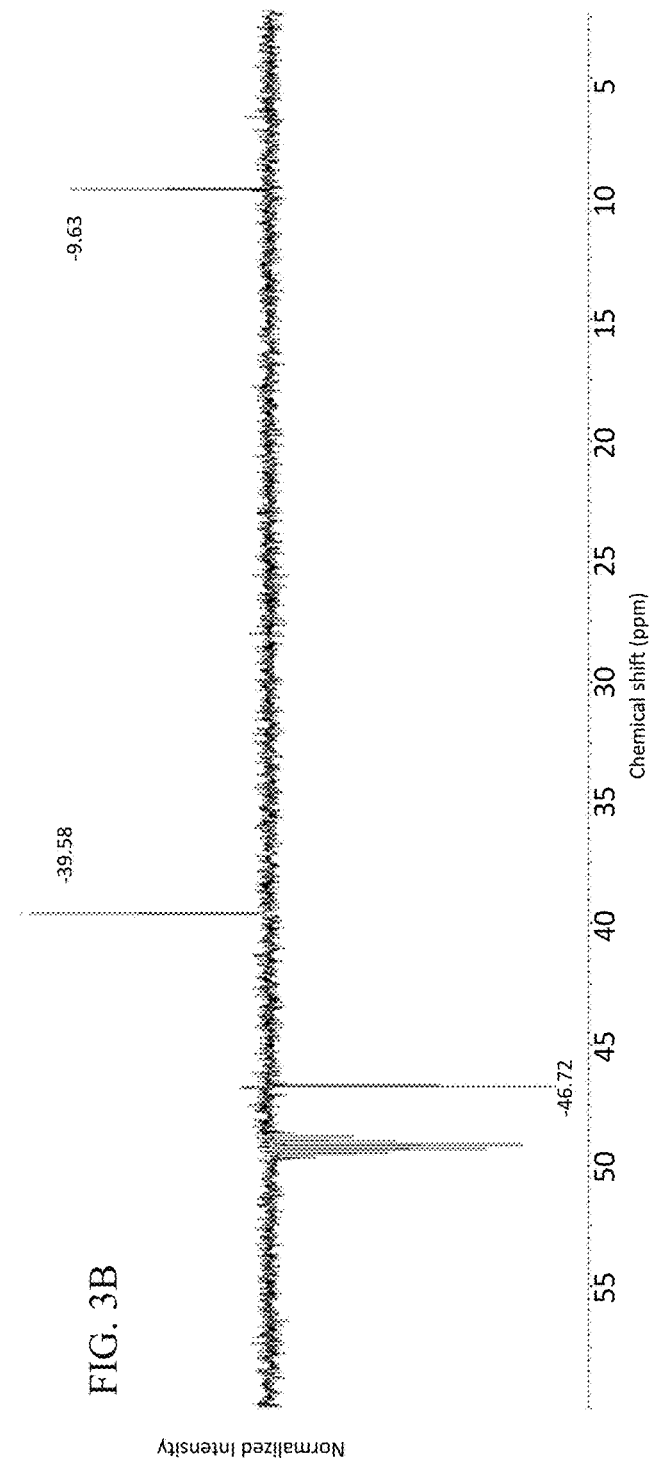
FIG. 3B is the experimental $^{13}$C-DEPT-135-NMR spectrum of the polar, water-soluble ODSO fraction used as an active component carrier herein.

Reference Example: The ODSO mixtures used in the Examples below were produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon monosulfur content) was 2.90. After the addition of the oxidant was complete, the reaction vessel temperature was set to reflux at 80° C. for approximately one hour after which the water soluble ODSO was produced (referred to as Composition 2 herein and in U.S. Pat. No. 10,781,168) and isolated after the removal of water. The catalyst used in the oxidation of the DSO compounds was sodium tungstate. The Composition 2, referred to herein as "the selected water soluble ODSO fraction," was used. FIG. 3A is the experimental $^1$H-NMR spectrum of the polar, water soluble ODSO mixture that is the selected water soluble ODSO fraction in the example herein. FIG. 3B is the experimental $^{13}$C-DEPT-135-NMR spectrum of the polar, water soluble ODSO mixture that is the selected water soluble ODSO fraction in the example herein. The selected water soluble ODSO fraction was mixed with a $CD_3OD$ solvent and the spectrum was taken at 25° C. Methyl carbons have a positive intensity while methylene carbons exhibit a negative intensity. The peaks in the 48-50 ppm region belong to carbon signals of the $CD_3OD$ solvent.

When comparing the experimental $^{13}$C-DEPT-135-NMR spectrum of FIG. 3B for the selected water soluble ODSO fraction with a saved database of predicted spectra, it was found that a combination of the predicted alkyl-sulfoxides-ulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxides-ulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the selected water soluble ODSO fraction. It is clear from the NMR spectra shown in FIGS. 3A and 3B that the selected water soluble ODSO fraction comprises a mixture of ODSO compounds that form an ODSO active component carrier composition of the present disclosure.

Comparative Example 1: In a first comparative example, SBA-15, mesoporous silica, was synthesized. 1.59 g of Pluronic P123 ($mw_{av}$ 5750) was dissolved in 55.24 g water and 5.16 g HCl (37 wt. %) at 40° C. Once dissolved 3.3 g tetraethyl orthosilicate (99 wt. %) was added to the solution and the system was further stirred at 40° C. for 24 hours for the hydrolysis reaction to proceed. The molar ratio of these components can be expressed as

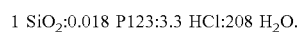

1 $SiO_2$:0.018 P123:3.3 HCl:208 $H_2O$.

The mixture was transferred to a polytetrafluoroethylene (PTFE) lined autoclave and the system isolated. The mixture was subjected to a temperature of 100° C. for 48 hours for the condensation reaction to proceed. After the desired time the autoclave was cooled and the product filtered under vacuum before washing with water. The resulting powder was dried at 100° C. to yield the as-made product. The as-made product was calcined at 550° C. (1° C./min) for 8 hours to yield the calcined SBA-15 mesoporous silica material.

Figure 4:
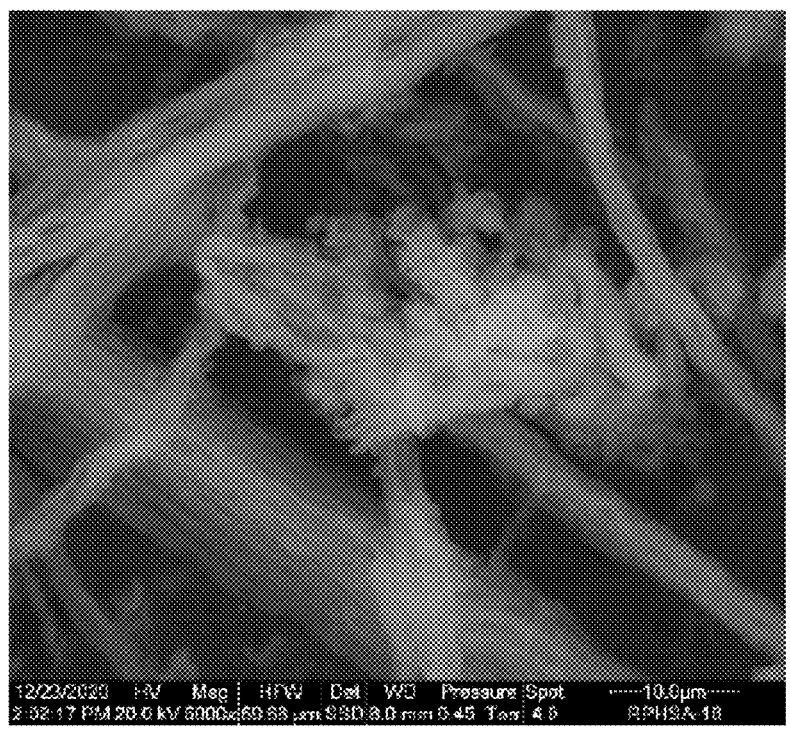
FIG. 4 is a scanning electron microscopy image of conventional SBA-15 synthesized in a comparative example herein.
Figure 5:
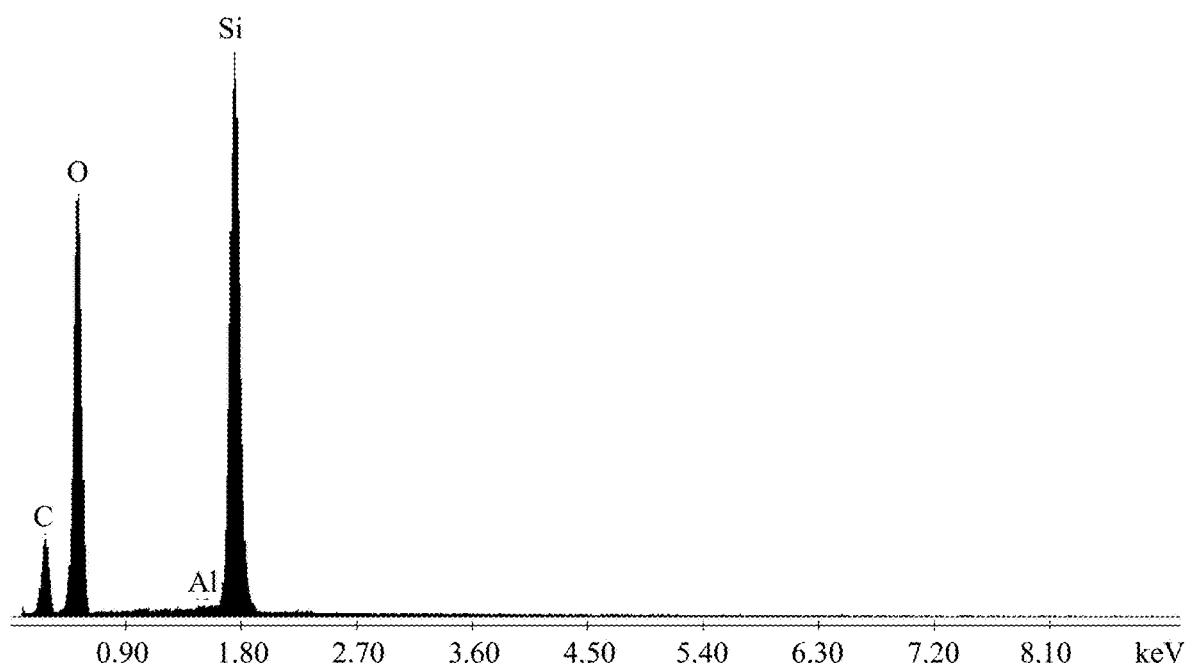
FIG. 5 depicts an energy-dispersive X-ray analysis pattern of conventional SBA-15 synthesized in the comparative example herein.

FIG. 4 shows a scanning electron microscopy image of the SBA-15 produced in the Comparative Example 1. The corresponding energy-dispersive X-ray (EDX) spectroscopy pattern is presented in FIG. 5, showing the intensity (counts) on the y-axis and energy (keV) on the x-axis. There is no evidence of tungsten present by EDX spectroscopy.

Example 1: Mesoporous silica was synthesized in the presence of an active component carrier composition, ODSO containing tungsten, as described in the Reference Example. 1.59 g of Pluronic P123 (mw$_{av}$ 5750) was dissolved in 55.24 g water and 5.16 g water-soluble ODSO at The ODSO used in Example 1 was the mixture obtained as the selected water soluble ODSO fraction described in the Reference Example. Once dissolved, 3.3 g tetraethyl orthosilicate (99 wt. %) was added to the solution and stirring was continued at 40° C. for 24 hours for the hydrolysis reaction to proceed. The molar ratio of these components, including ODSO* instead of HCl as in the comparative example, can be expressed as:

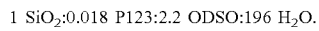

1 SiO$_2$:0.018 P123:2.2 ODSO:196 H$_2$O.

*Based on the data in the referenced U.S. Pat. No. 10,781,168, an average molecular weight of 151.2 can be assumed, for a molar composition of 2.2. relative to the other components as shown.

Thereafter, the mixture was transferred to a PTFE-lined autoclave and the system isolated. The mixture was subjected to a temperature of 100° C. for 48 hours for the condensation reaction to proceed. After the desired time the autoclave was cooled and the product filtered under vacuum before washing with water. The resulting powder was dried at 100° C. to yield the as-made MS-ODSO material (also referred to herein as the uncalcined mesoporous silica material). The as-made material was calcined at 550° C. (1° C./min) for 8 hours to yield the calcined mesoporous silica material.

Figure 6:
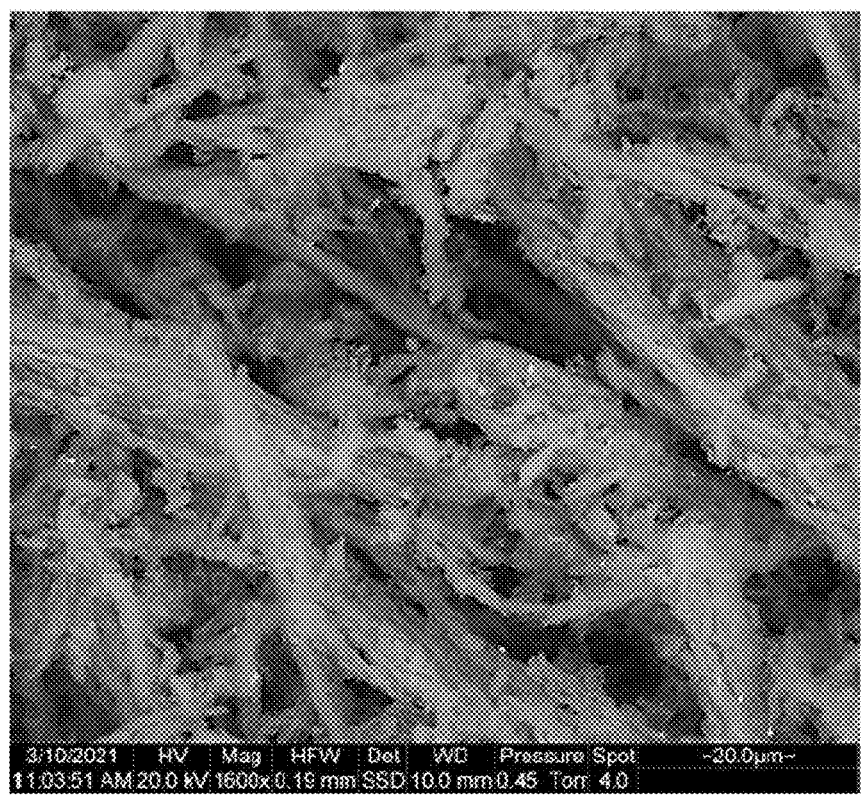
FIG. 6 is a scanning electron microscopy image of mesoporous silica synthesized in an example herein in the presence of an active component carrier described herein.
Figure 7:
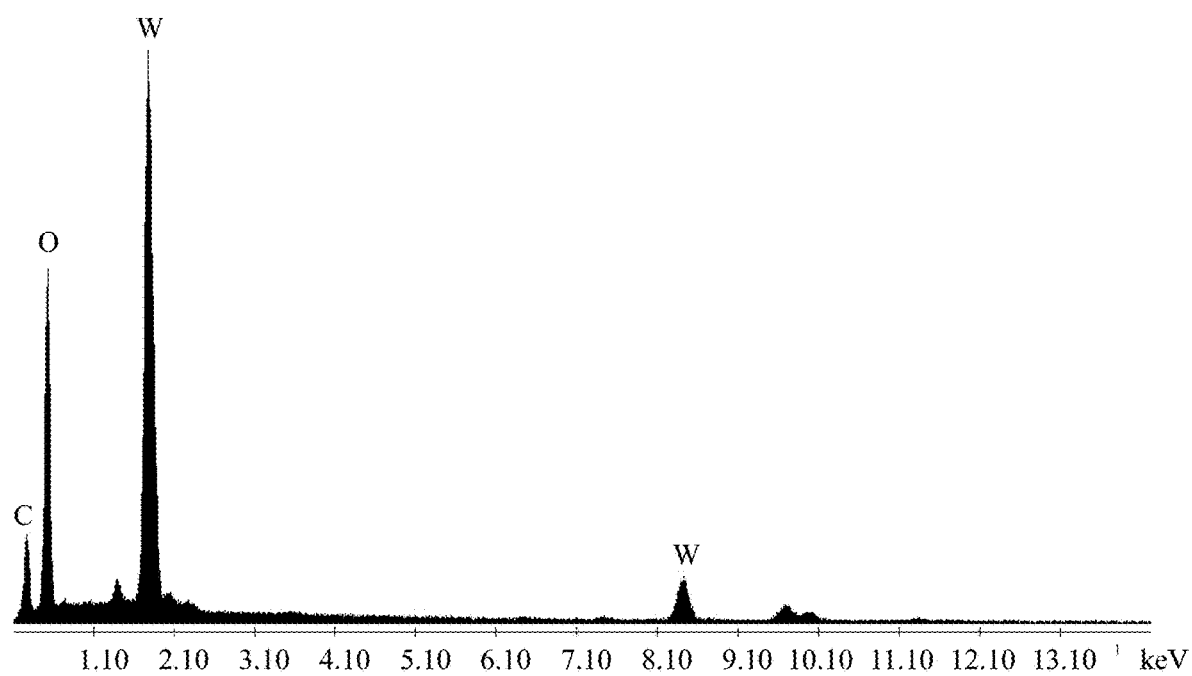
FIG. 7 depicts an energy-dispersive X-ray analysis pattern of mesoporous silica synthesized in the example herein in the presence of an active component carrier described herein.

FIG. 6 shows a scanning electron microscopy image of the mesoporous silica produced in Example 1. The corresponding EDX spectroscopy pattern is presented in FIG. 7 showing the intensity (counts) on the y-axis and energy (keV) on the x-axis when the aperture for the EDX analysis is focused over a bright spot. There is clear evidence of tungsten present by EDX spectroscopy homogeneously across the material as the bright spots indicative of W are well distributed.

Comparative Example 2: In a second comparative example, silicoaluminophosphate (SAPO) was synthesized. Aluminum isopropoxide (4.9012 g) was weighed into a Teflon liner (45 ml). Thereafter, water (6.4838 g) and phosphoric acid (2.7102 g 85 wt. %) were added and the mixture was kept under stifling until the Al source had dissolved. A silica source, (0.5503 g, 40 wt. %), was added and the mixture stirred until homogeneous. Finally, a structure directing agent, tetraethylammonium hydroxide (8.6602 g, 40 wt. %) was added and the mixture stirred until homogeneous.

The PTFE liner was positioned within an autoclave and transferred to an oven and heated to a temperature of 200° C. whilst rotating the autoclave. The autoclave was kept at isothermal conditions for 5 days. Thereafter, the product was washed with distilled water and dried.

Figure 8:
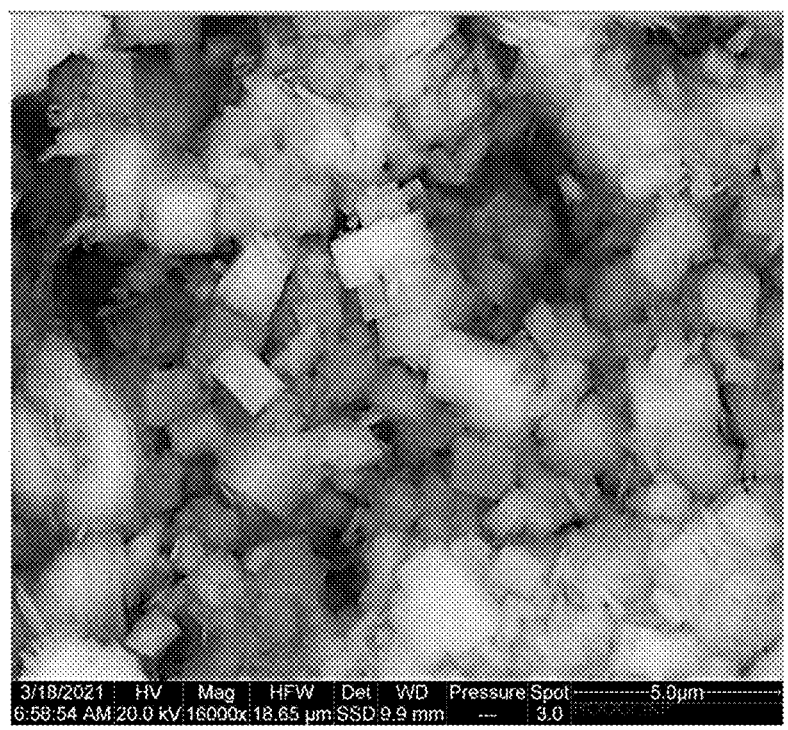
FIG. 8 is a scanning electron microscopy image of conventional silicoaluminophosphate synthesized in a comparative example herein.
Figure 9:
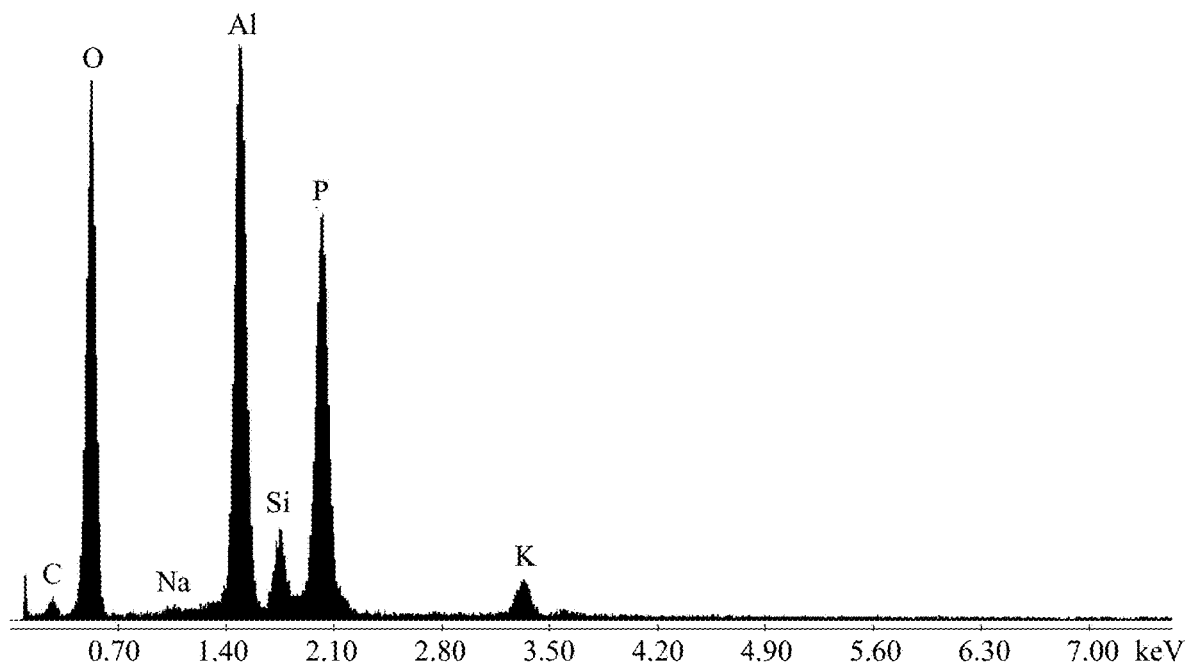
FIG. 9 depicts an energy-dispersive X-ray analysis pattern of conventional silicoaluminophosphate synthesized in the comparative example herein.

FIG. 8 shows a scanning electron microscopy image of the SAPO material produced. The corresponding EDX spectroscopy pattern is presented in FIG. 9 showing the intensity (counts) on the y-axis and energy (keV) on the x-axis. There is no evidence of tungsten present by EDX spectroscopy.

Example 2: Aluminophosphate (AlPO) was synthesized in the presence of an active component carrier composition, ODSO containing tungsten, as described in the Reference Example. Aluminum isopropoxide (4.9022 g) was weighed into a PTFE liner (45 ml). Thereafter, ODSO (6.4820 g) and phosphoric acid (2.7131 g 85 wt. %) were added and the mixture was kept under stirring until the Al source had dissolved. The ODSO used in Example 2 was the mixture obtained as the selected water soluble ODSO fraction described in the Reference Example, and in this example replaced the added water. A silica source, (0.5307 g, 40 wt. %), was added and the mixture stirred until homogeneous. Finally, a structure directing agent, tetraethylammonium hydroxide (8.6605 g, 40 wt. %) was added and the mixture stirred until homogeneous.

The PTFE liner was positioned within an autoclave and transferred to an oven and heated to a temperature of 200° C. whilst rotating the autoclave. The autoclave was kept at isothermal conditions for 5 days. Thereafter, the product was washed with distilled water and dried.

Figure 10:
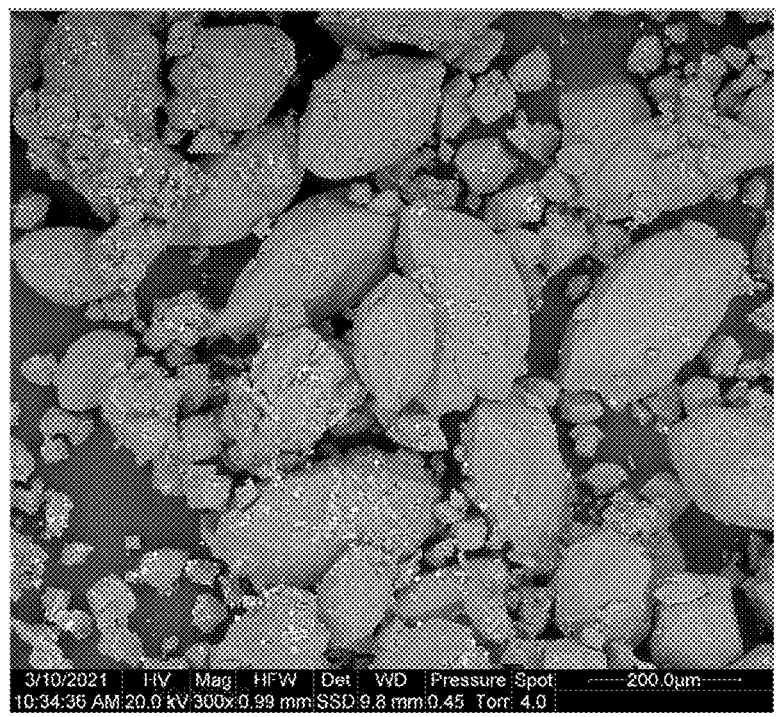
FIG. 10 is a scanning electron microscopy image of aluminophosphate synthesized in an example herein in the presence of an active component carrier described herein.
Figure 11:
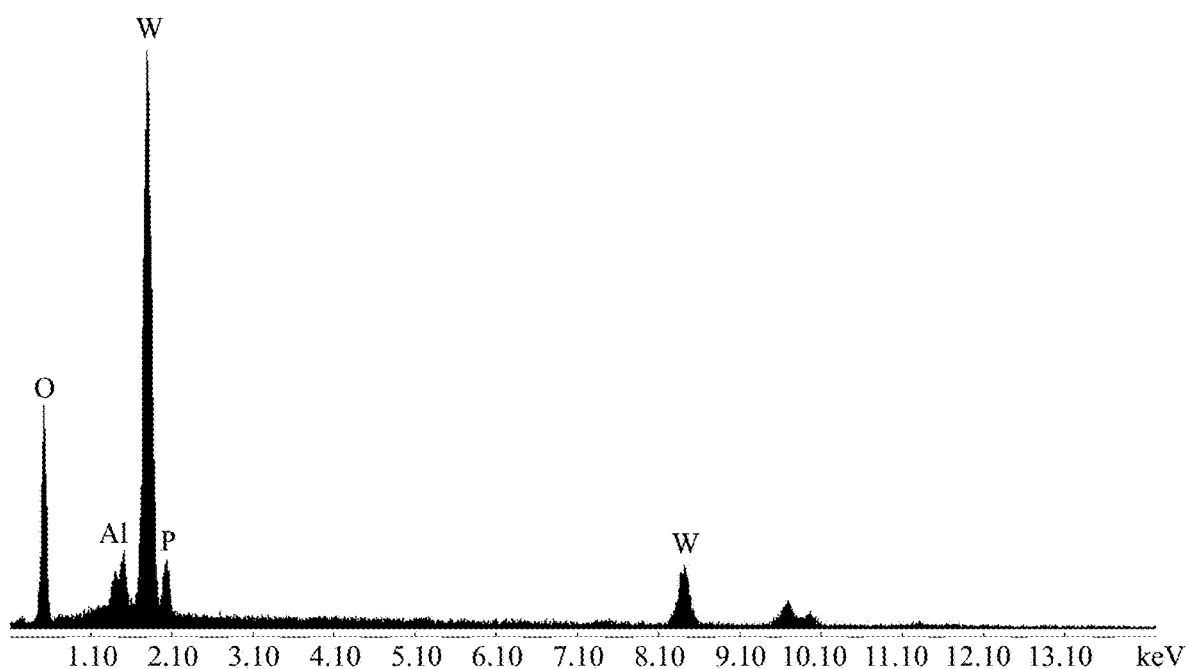
FIG. 11 depicts an energy-dispersive X-ray analysis pattern of aluminophosphates synthesized in the example herein in the presence of an active component carrier described herein.

FIG. 10 shows a scanning electron microscopy image of the AlPO material produced. The corresponding EDX spectroscopy pattern is presented in FIG. 11 showing the intensity (counts) on the y-axis and energy (keV) on the x-axis, when the aperture for the EDX analysis is focused over a bright spot. There is clear evidence of tungsten present by EDX spectroscopy homogeneously across the material as the bright spots indicative of W are well distributed.

It is also observed that in the Comparative Example 2, in the absence of ODSO (referred to as "water only") the pH of the sol-gel is higher relative to that of Example 2 in the presence of acidic ODSO, where 100% of the additional water is substituted for ODSO. The acidic nature of the system in Example 2 resulted in a phase transition from SAPO to AlPO. Silica remains be in solution with the mother liquor after crystallization, and is in the solute after filtration. In the Example 2, the synthesis parameters shifted outside of the phase boundary for SAPO.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples |
|---|---|---|
| Dialkyl-sulfonesulfoxide Or 1,2-alkyl-alkyl-disulfane 1,1,2-trioxide | (R—SOO—SO—R') | 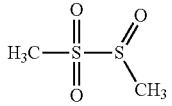<br>1,2-Dimethyldisulfane 1,1,2-trioxide |
| Dialkyl-disulfone Or 1,2 alkyl-alkyl-disulfane 1,1,2,2-tetraoxide | (R—SOO—SOO—R') | 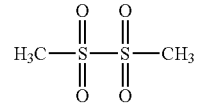<br>1,2-Dimethyldisulfane 1,1,2,2-tetraoxide |
| Alkyl-sulfoxidesulfonate | (R—SO—SOO—OH) | 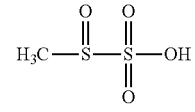<br>Methylsulfanesulfonic acid oxide |
| Alkyl-sulfonesulfonate | (R—SOO—SOO—OH) | 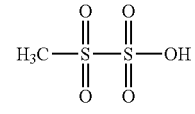<br>1-Hydroxy-2-methyldisulfane 1,1,2,2-tetraoxide |
| Alkyl-sulfoxidesulfinate | (R—SO—SO—OH) | 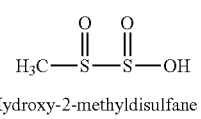<br>1-Hydroxy-2-methyldisulfane 1,2-dioxide |
| Alkyl-sulfonesulfinate | (R—SOO—SO—OH) | 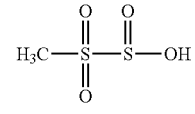<br>Methylsulfanesulfinic acid dioxide |

R and R' can be the same or different C1-C10 alkyl or C6-C10 aryl

What is claimed is:

1. A method for synthesis of a material comprising:
    forming a homogeneous aqueous mixture of precursors, reagents and an active component carrier comprising a mixture of one or more catalytically active components and one or more oxidized disulfide oil (ODSO) compounds, the active component carrier provided in an amount effective to facilitate transfer of catalytically active components;
    heating the homogeneous aqueous mixture under conditions and for a time effective to form solids as precipitate suspended in a supernatant as an intermediate suspension, wherein the precipitate comprises the synthesized material which contains one or more catalytically active components transferred from the active component carrier composition.

2. The method of claim 1, wherein the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl.

3. The method of claim 1, wherein the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl.

4. The method of claim 3, wherein the mixture corresponds to oxidized disulfide oils present in an effluent refinery hydrocarbon stream recovered following catalytic oxidation of mercaptans present in the effluent refinery hydrocarbon stream.

5. The method of claim 1, wherein the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl.

6. The method of claim 1, wherein the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl.

7. The method of claim 1, wherein the one or more catalytically active components are metals or metal compounds selected from the Periodic Table of the Elements IUPAC Groups 4-12.

8. The method of claim 1, comprising 0.01-5 percent by mass of the one or more catalytically active components.

9. The method of claim 1, wherein the active component carrier composition is in an aqueous solution.

10. The method of claim 1, wherein the active component carrier composition further comprises one or more additional acidic components.

11. The method as in claim 10, wherein the one or more additional acidic components are selected from the group consisting of hydrochloric acid, sulfuric acid, nitric acid, aqua regia, citric acid, acetic acid and combinations comprising one or more of the foregoing acidic components.

12. The method as in claim 10, wherein the one or more ODSO compounds are contained in reaction products, or a fraction of reaction products, derived from oxidation of disulfide oil compounds in the presence of an oxidation catalyst, wherein all or a portion of the oxidation catalyst is contained in the reaction products or the fraction of reaction products and is all or a portion of the one or more catalytically active components in the active component carrier composition.

13. The method of claim 12, wherein the oxidation catalyst are metals or metal compounds containing one or more transition metals.

14. The method as in claim 1 wherein the homogeneous aqueous mixture is acidic.

15. The method as in claim 1 wherein a pH of the homogeneous aqueous mixture is neutral to about 7.8.

16. The method as in claims 1, wherein the synthesized material comprises mesoporous silica which contains one or more catalytically active components transferred from the active component carrier composition, and the precursors and reagents comprise a silica source, an optional organosilane, and a surfactant as a soft template material to influence a silica mesoporous structure, wherein the active component carrier composition comprises an acid medium for synthesis of mesoporous silica.

17. The method as in claim 1, wherein the synthesized material comprises a crystalline microporous aluminophosphate which contains one or more catalytically active components transferred from the active component carrier composition, and the precursors and reagents comprise an alumina source, an optional silica source, a phosphorus source, an acid medium, and a structure directing agent.

18. The method as in claim 1, wherein the active component carrier composition comprises one or more ODSO compounds that are contained in reaction products, or a fraction of reaction products, derived from controlled catalytic oxidation of disulfide oil compounds in the presence of an oxidation catalyst containing one or more transition metals.

19. The method as in claim 18, comprising tungsten as at least one of said one or more transition metals.

* * * * *